May 27, 1941.    W. H. REED    2,243,652
FLUID CLUTCH
Filed Jan. 18, 1940    4 Sheets-Sheet 1
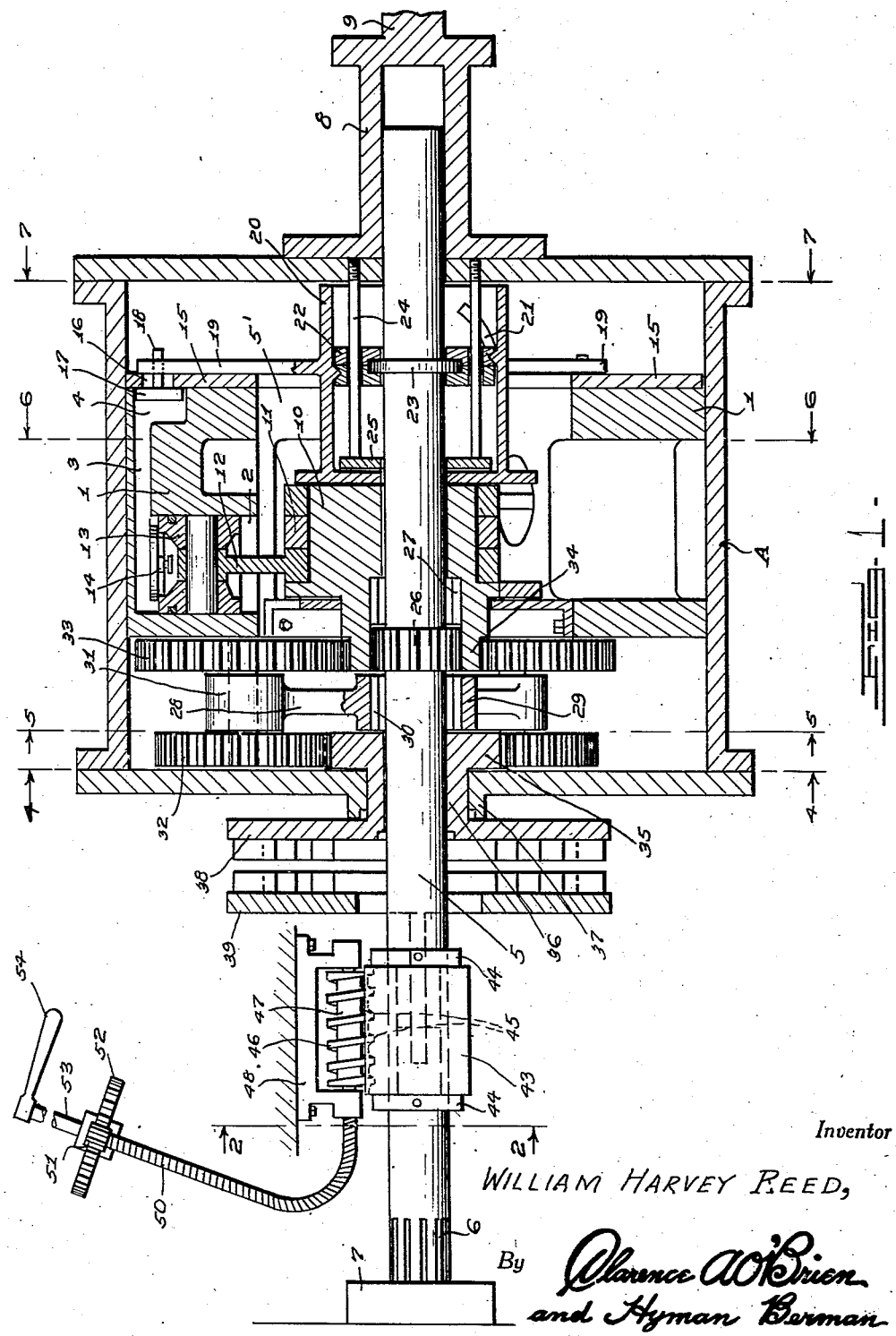
Inventor
WILLIAM HARVEY REED,
By Clarence A. O'Brien
and Hyman Berman
Attorneys

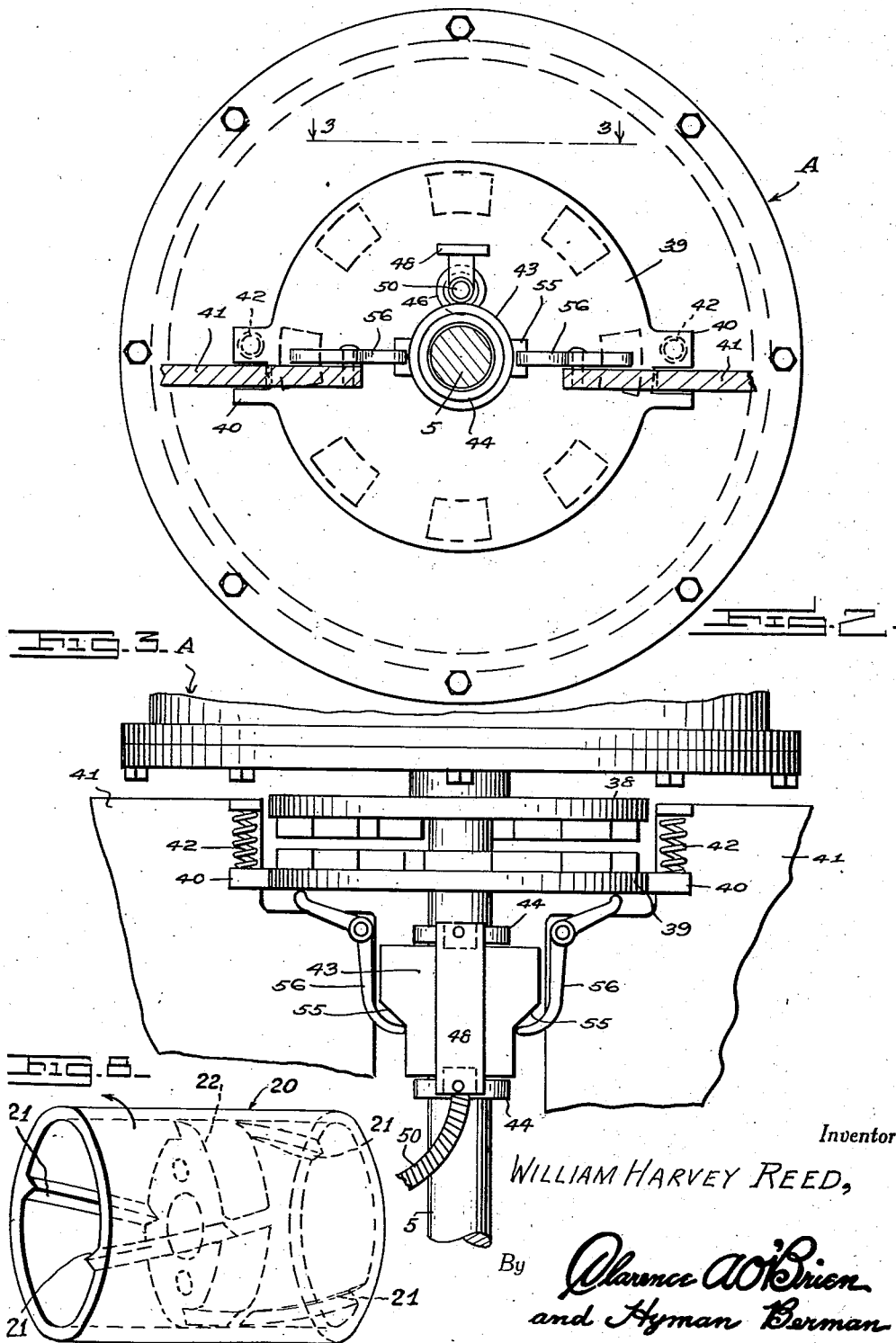

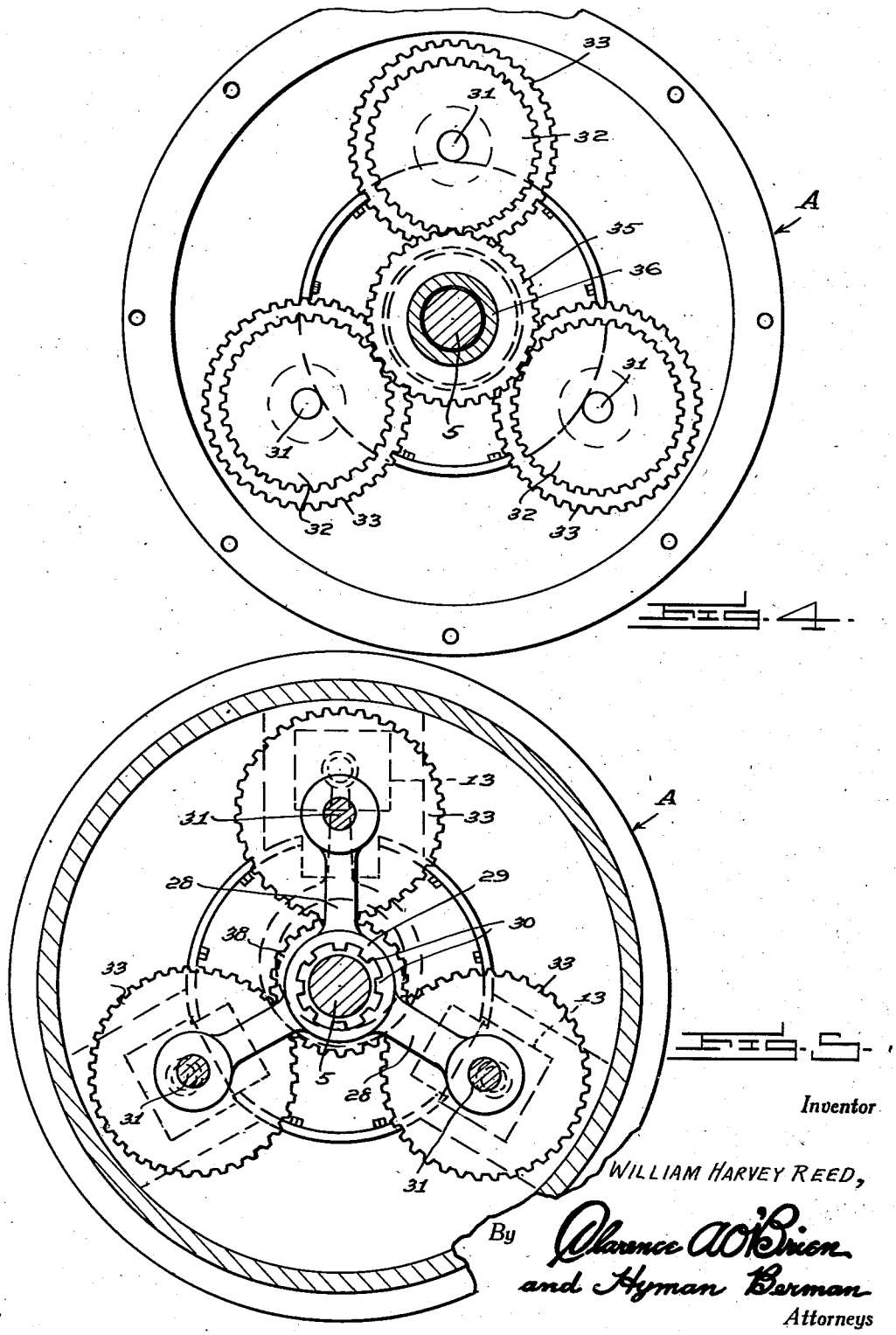

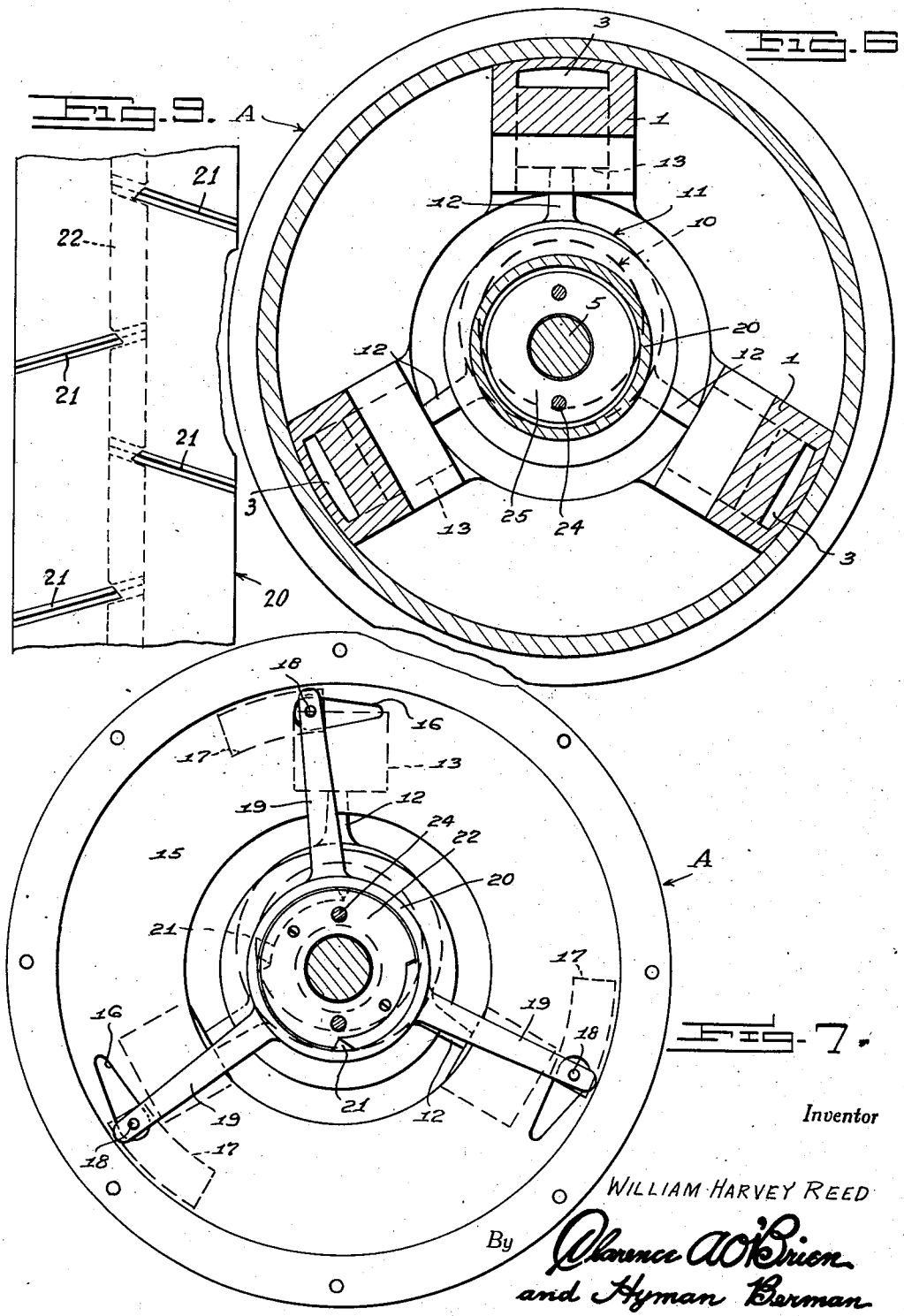

Patented May 27, 1941

2,243,652

UNITED STATES PATENT OFFICE 2,243,652

FLUID CLUTCH

William Harvey Reed, Effingham, Ill.

Application January 18, 1940, Serial No. 314,569

4 Claims. (Cl. 192—60)

This invention relates to a fluid clutch and transmission means, the general object of the invention being to provide means for transmitting motion from a drive shaft to a driven shaft through fluid means which includes pistons operated in a housing containing oil with valve means for controlling the flow of oil through the pistons and with manually operated means for controlling the position of the valve means and for changing gearing whereby the driven shaft can be rotated in one direction or the other and at different speeds from the drive shaft.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a vertical sectional view through the invention.

Figure 2 is a section on the line 2—2 of Figure 1.

Figure 3 is a top plan view of the manually controlled actuating means and the clutch means.

Figure 4 is a section on the line 4—4 of Figure 1.

Figure 5 is a section on the line 5—5 of Figure 1.

Figure 6 is a section on the line 6—6 of Figure 1.

Figure 7 is a section on the line 7—7 of Figure 1.

Figure 8 is a perspective view of the drum for operating the valves, this view showing the interior parts in dotted lines.

Figure 9 is a diagrammatic view showing the drum flattened out to show the relation between the collar in the drum and the internal ribs in the drum.

In these drawings the letter A indicates a housing containing oil or the like and which contains a supporting body 1 which is formed with the radiating cylinders 2, the outer passages 3 which lead from the outer ends of the cylinders rearwardly and terminate in valve chambers 4 and the body is also formed with the enlarged centrally arranged circular opening 5'. The body is suitably connected with the rim of the housing. A drive shaft 5 passes through the housing with its front end splined as at 6 for slidable but non-rotatable connection with a power plant, a part of which is shown at 7 in Figure 1. The other end of the shaft extends into a tubular part 8 of a driven shaft 9, said tubular part being suitably connected with the rear end of the housing at the center thereof. An eccentric member 10 is rotatably arranged on an intermediate part of the shaft within the housing A and eccentric rings 11 fit over the eccentric and each ring has a connecting rod 12 attached thereto for a piston 13. Each piston is arranged in a cylinder 2 and each piston has a passage therethrough the outer end of which is controlled by a flap valve 14 which opens outwardly but closes inwardly. The housing contains oil or the like and during the reciprocatory movement of the pistons by the eccentrics oil will pass through the pistons as they move inwardly and by the valves 14 through the passages 3 and return to the main part of the housing but the valves 14 will prevent oil from passing from passages 3 through the pistons when the pistons move outwardly. A ring-shaped plate 15 is fastened against the rear end of the body 1 and has the elongated substantially oval-shaped ports 16 therein which communicate with the valve chambers 4. As shown in Figure 7 each port has one end larger than the other and the port tapers from the large end to the small end. A valve 17 controls each port and is located in the chamber 4 and has a stem 18 thereon which passes through the port and is carried by the outer end of an arm 19, these arms being carried by a drum 20 which encircles the shaft 5 at the rear part of the housing and is located between the rear end of the eccentric and the rear wall of the housing. The drum is rocked in one direction or the other by having spiral ribs 21 on its interior which engage spiral grooves in a sectional collar 22 placed in the drum and surrounding the shaft 5 and said collar is held in position on the shaft by a small flange 23 on the shaft engaging an internal groove in the collar. The collar is held against rotary movement with the shaft by means of the bolts 24 connected at their rear ends with the rear wall of the housing and at their front ends to a ring 25 which encircles the shaft and bears against the front end of the drum 20, the rods passing through holes in the collar 22 so that as the shaft 5 is moved longitudinally the collar is also moved but is held against rotary movement and thus this movement of the collar imparts a partial rotary movement to the drum through the spiral grooves in which the spiral ribs of the drum fit. This, of course, causes the arms 19 of the drum to move the valves to open and closed positions.

A pinion 26 is carried by an intermediate part of the shaft and the forward end of the eccentric 10 is provided with an internal gear 27 which will fit over the pinion 26 when the shaft 5 is moved rearwardly and in front of this internal gear the forward end of the eccentric is provided with a smooth bore for receiving the pinion when the parts are in neutral position. A spider 28 has a hub part 29 encircling the shaft in front of the eccentric and said hub is formed with an internal gear 30 for fitting over the pinion 26 when the shaft is moved forwardly. The gears 26 and 27 form positive clutch means for connecting the shaft 5 to the eccentric 10 and said gear 26 and the internal gear 30 of spider 28 forms positive clutch means for connecting the spider to the shaft 5. This spider carries at its outer ends the stub shafts 31 which at their front ends carry the small gears 32 and at their rear ends the larger gears 33, these gears 33 meshing with an external gear 34 formed at the front end of the eccentric 10 while the gears 32 mesh with a gear 35 formed on the inner end of a hub 36 which passes through a bearing boss 37 at the center of the front wall of the housing A and said hub at its front end has the clutch disk 38 thereon. Of course, the hub 36 is rotatably arranged on the shaft 5. A slidable but non-rotatable clutch disk 39 surrounds the shaft 5 in front of the disk 38 and this disk 39 has the notched ears 40, the notches of which receive edge portions of the stationary members 41 of the apparatus and thus the disk 39 is held against rotary movement but may slide on the members 41. Springs 42 between parts of the members 41 and said ears 40 tend to move the disk 39 forwardly and out of engagement with the disk 38 as shown in Figure 3.

A sleeve 43 is rotatably but non-slidably held on the forward part of the shaft 5 by the collars 44 and a part of this sleeve 43 is flattened and formed with the spiral teeth 45 for engagement by the spiral threads 46 of a shaft 47 journaled in the stationary bracket 48 connected to a stationary part of the apparatus. This shaft 47 is connected to a flexible shaft 50 having a pinion 51 at its other end which meshes with a gear 52 on a shaft 53 provided with a hand lever 54, these parts being suitably supported adjacent the operator's seat. The sleeve 43 is formed with the wide rear portion which at its junction with the narrow front portion forms sloping shoulders or cams 55 for engagement by the bellcranks 56 pivoted to the stationary members 41 and having rounded rear ends for engaging the disk 39, see Figure 3.

With the parts in the position shown in Figure 1 the device is in neutral position and everything is idle though the drive shaft 5 may be rotated. Then when it is desired to drive shaft 9 in a forward direction the shaft 47 is actuated by the manual control means through means of the lever 54 to move the sleeve 43 and, therefore, the shaft 5 to the right in Figure 1. This movement of shaft 5 will cause the pinion 26 to engage the internal gear 27 of the eccentric 10 which will cause the pistons to reciprocate so as to start the flow of oil or liquid through the pistons and cylinders. This movement of the shaft 5 to the right will also cause the collar 22 moving rearwardly with the shaft 5 to partly rotate the drum 20 which causes the arms 19 to start to close the valves 17. However, due to the size and shape of the ports 16 the valves 17 will not act to check the flow of oil from the passages 3 through such ports until the pinion 26 has moved over gear 27 to a certain extent so that the pistons will be in operation for a limited time before the valves 17 appreciably check the flow of oil through the ports 16. Of course, if the valves fully close the ports the pistons will be stopped but if the valves only partly close the ports then the pistons will be checked in their movement. Whether or not the pistons are entirely stopped or only checked depend on the amount of closing movement imparted to the valves 17 and this, in turn, is controlled by the operator moving the shaft 5 rearwardly to the point desired. Of course, this checking or stopping of the movement of the pistons will lock the housing to the shaft 5 or partly so and thus the housing will rotate with the shaft 5 and this movement is imparted to the driven shaft 9. In this way the operator can drive the shaft 9 either at the same speed as that of shaft 5 or at any intermediate speed by simply moving the shaft 5 rearwardly to control the position of the valves 17 relative to the ports 16.

When the operator wishes to reverse the rotary movement of the shaft 9 he rotates the shaft 47 in an opposite direction which will result in moving the sleeve 43 forwardly which causes the cams 55 to engage the levers 56 to impart pressure to the disk 39 which presses said disk against the action of the springs 42 into engagement with the disk 38 and this, of course, locks the disk 38 against rotary movement and this movement to the left of shaft 5 causes the pinion 26 thereon to engage the internal gear 30 of the spider 28 which will cause the spider to rotate with the shaft 5 and this results in the gears 32 traveling around the gear 35 which is connected with the clutch disk 38 which is now held stationary. As the gears 33 are of larger diameter than the gears 32 engagement of these gears 33 with the pinion 34 of the eccentric 10 will cause said eccentric to rotate in a reverse direction which, of course, results in the reciprocation of the pistons and movement of the valves 17 to closed position or partly closed to regulate the speed of rotation of the housing A and the driven shaft 9 as before mentioned.

The invention is mainly designed for use on motor vehicles but it will be understood that it can be used wherever speed reducing means are needed and its use in motor vehicles will render the use of clutch and transmission means unnecessary and it may also be used as a brake for the vehicle.

It is thought from the foregoing description that the advantages and novel features of the invention will be readily apparent.

It is to be understood that changes may be made in the construction and in the combination and arrangement of the several parts provided that such changes fall within the scope of the appended claims.

Having described the invention, what is claimed as new is:

1. In a device of the class described, a housing containing liquid, a driven shaft connected with the housing, a drive shaft extending into the housing, an eccentric located in the housing and rotatably supported on said drive shaft, pistons in the housing, cylinders in the housing in which the pistons operate, means for reciprocating the pistons from the eccentric, outwardly opening valves in the pistons, said housing having passages therein connecting the outer ends of the cylinders with the inner ends of said cylinders, valve means for controlling the passages, means for actuating the valve means by longitudinal movement of the drive shaft, means for connecting the drive shaft with the eccentric by longitudinal movement of the shaft, said eccentric normally being free of the drive shaft and manually operated means for moving the drive shaft longitudinally.

2. In a device of the class described, a housing containing liquid, a driven shaft connected with the housing, a drive shaft extending into the housing, an eccentric located in the housing and rotatably supported on said drive shaft, pistons in the housing, cylinders in the housing in which the pistons operate, means for reciprocating the pistons from the eccentric, outwardly opening valves in the pistons, said housing having passages therein connecting the outer ends of the cylinders with the inner ends of the cylinders, valve means for controlling the passages, means for actuating the valve means by longitudinal movement of the drive shaft, means for connecting the drive shaft with the eccentric by longitudinal movement of the shaft, said eccentric normally being free of the drive shaft and manually operated means for moving the drive shaft longitudinally, said means for connecting the drive shaft with the eccentric being positive clutch means which include a ring gear on the eccentric and a pinion on the shaft for engaging the ring gear when the shaft is moved in one direction.

3. In a device of the class described, a rotary housing having cylinders therein and containing liquid, pistons in the cylinders and said housing having passages connecting the outer ends of the cylinders with the inner ends thereof, valves controlling the passages, a drum rotatably arranged in the housing, arms radiating from the drum and connected with the valves, a drive shaft extending into the housing and rotatably supported therein, means for rotating the drum by longitudinal movement of the shaft, an eccentric on the shaft, means for reciprocating the pistons by rotary movement of the eccentric, means for rotating the eccentric from the shaft when the shaft is in one position, said shaft being free of the eccentric when in a neutral position, and manually operated means for moving the shaft longitudinally in either direction.

4. A device of the class described comprising a rotary housing having a part containing liquid, cylinders arranged in the housing and having their inner ends communicating with the liquid receiving part of the housing, passages extending from the outer ends of the cylinders to said liquid receiving part of the housing, valve means for controlling the passages, a drum rotatably arranged in the housing, arms extending from the drum and carrying the valve means, a drive shaft extending into the housing and rotatably supported therein, pistons in the cylinders, means for reciprocating the pistons, means for actuating such piston reciprocating means when the shaft is in one position and said means being idle when the shaft is in another position and means for actuating the valve operating drum by longitudinal movement of the shaft in a direction to connect the piston actuating means with the shaft.

WILLIAM HARVEY REED.